US010484812B2

(12) United States Patent
Matsumura et al.

(10) Patent No.: US 10,484,812 B2
(45) Date of Patent: Nov. 19, 2019

(54) SPEAKER SYSTEM AND SIGNAL PROCESSING METHOD

(71) Applicant: Panasonic Intellectual Property Corporation of America, Torrance, CA (US)

(72) Inventors: Toshiyuki Matsumura, Osaka (JP); Atsushi Sakaguchi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/134,953

(22) Filed: Sep. 18, 2018

(65) Prior Publication Data

US 2019/0098430 A1 Mar. 28, 2019

(30) Foreign Application Priority Data

Sep. 28, 2017 (JP) ................................ 2017-188769
Jun. 1, 2018 (JP) ................................ 2018-106219

(51) Int. Cl.

| | |
|---|---|
| ***H04R 5/02*** | (2006.01) |
| ***H04S 7/00*** | (2006.01) |
| ***H04R 5/04*** | (2006.01) |
| ***H04R 3/04*** | (2006.01) |
| ***H04S 3/00*** | (2006.01) |
| ***H04R 3/12*** | (2006.01) |
| *H04B 1/00* | (2006.01) |
| *H04R 1/40* | (2006.01) |

(52) U.S. Cl.
CPC ............... *H04S 7/303* (2013.01); *H04R 3/04* (2013.01); *H04R 3/12* (2013.01); *H04R 5/02* (2013.01); *H04R 5/04* (2013.01); *H04S 3/008* (2013.01); *H04S 7/302* (2013.01); *H04R 1/403* (2013.01); *H04R 2201/403* (2013.01); *H04R 2499/13* (2013.01); *H04S 2400/01* (2013.01)

(58) Field of Classification Search
CPC ........... H04S 7/303; H04R 1/403; H04R 3/04; H04R 3/12; H04R 5/02
USPC ...................................... 381/57–59, 86, 302
See application file for complete search history.

(56) References Cited

U.S. PATENT DOCUMENTS

2008/0025518 A1* 1/2008 Mizuno ................... H04S 3/002 381/17
2010/0310080 A1* 12/2010 Fukuyama ............... H04R 3/12 381/17
2016/0295342 A1* 10/2016 Miyasaka .............. G10K 15/08

FOREIGN PATENT DOCUMENTS

JP 2008-252189 10/2008
JP 2015-231087 12/2015

OTHER PUBLICATIONS

English Abstract of Kouji Matsumoto et al., "A Design of Directional Array Speakers with Specified Sidelobe Size", The Institute of Electronics, Information, and Communication Engineers (IEICE), IEICE technical report, 2004-74, Oct. 28, 2004.

* cited by examiner

*Primary Examiner* — Vivian C Chin
*Assistant Examiner* — Ammar T Hamid
(74) *Attorney, Agent, or Firm* — Greenblum & Bernstein, P.L.C.

(57) ABSTRACT

A speaker system has a speaker array including a plurality of first speakers and a first filter array. A peak of the directivity of reproduced sounds output from the speaker array. And the peak being in a direction in which the plurality of first speakers are arranged, is shifted toward a wall surface due to first filter processing performed by the first filter array.

11 Claims, 10 Drawing Sheets

SPEAKER SYSTEM AND SIGNAL PROCESSING METHOD

BACKGROUND

1. Technical Field

The present disclosure relates to a speaker system that enables spot reproduction by which reproduced sounds are audible only to a user present in a particular area.

2. Description of the Related Art

There is a known speaker system that performs signal processing on signals eligible for reproduction and reproduces sounds by using a speaker array so as to be loudly audible only in a particular direction (see, for example, Japanese Unexamined Patent Application Publication Nos. 2008-252189 and 2015-231087 and Matsumoto Kouji and Nishikawa Kiyoshi, "A Design of Directional Array Speakers with Specified Sidelobe Size", The Institute of Electronics, Information, and Communication Engineers (IEICE), IEICE technical report, 2004-74, p 13-p 18). In this type of speaker system, sounds can be provided only to a person who needs them. In space in an automobile, for example, sounds can be provided only to a user sitting on a particular seat. In a dwelling, sounds can be provided only to a particular place or a different sound can be provided to each of two places in the same space.

SUMMARY

In the speaker system described above, it is preferable to control directivity for signals in a wide frequency range.

One non-limiting and exemplary embodiment provides a speaker system that can control directivity for signals in a wide frequency range.

In one general aspect, the techniques disclosed here feature a speaker system that comprises a speaker array including a plurality of first speakers that are linearly placed and each of which receives a first signal that has been undergone first filter processing and amplification processing, a first filter array that performs the first filter processing, and a multi-channel amplifier that performs the amplification processing; the speaker array is placed in reproduction space that has a wall surface crossing an array direction in which the plurality of first speakers are arranged; and a peak of the directivity of reproduced sounds, corresponding to the first signal, that have been output from the speaker array, the peak being in the array direction, is shifted toward the wall surface due to the first filter processing.

The present disclosure implements a speaker system that can control directivity for signals in a wide frequency range and a signal processing method.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
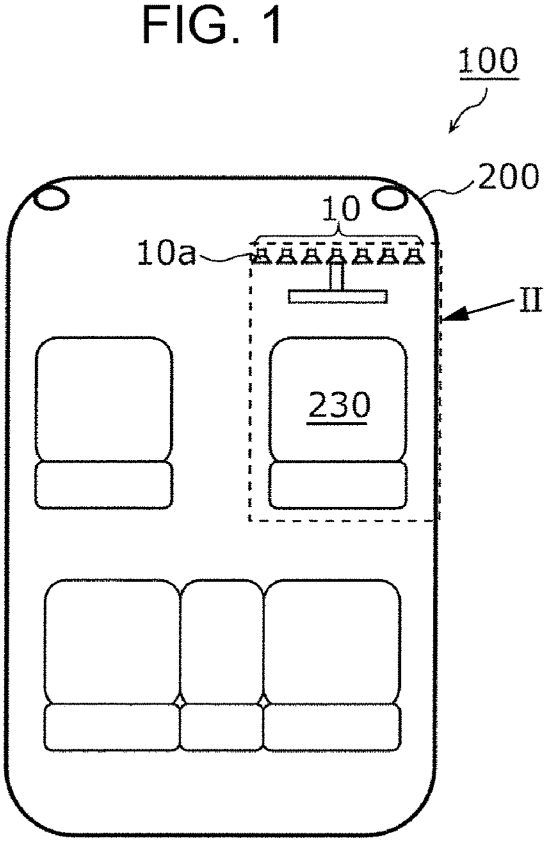
FIG. 1 is a plan view illustrating the interior of an automobile in which a speaker system according a first embodiment is placed.

A speaker system according to a first embodiment of the present disclosure comprises a speaker array including a plurality of first speakers that are linearly placed and each of which receives a first signal that has been undergone first filter processing and amplification processing, a first filter array that performs the first filter processing, and a multi-channel amplifier that performs the amplification processing. The speaker array is placed in reproduction space that has a wall surface crossing an array direction in which the plurality of first speakers are arranged. A peak of the directivity of reproduced sounds, corresponding to the first signal, that have been output from the speaker array, the peak being in the array direction, is shifted toward the wall surface due to the first filter processing.

Thus, the speaker system can lower the lower frequency limit of a frequency band within which directivity can be controlled. That is, a speaker system is implemented that can control directivity for signals in a relatively wide frequency band.

The peak appears, for example, on the wall surface.

Thus, the speaker system can lower the lower frequency limit of a frequency band within which directivity can be controlled to half that in a speaker system, described later, in a comparative example illustrated in FIG. 7, the speaker system having a speaker array with the same length as the speaker array in the first embodiment. That is, a speaker system can be implemented that can control directivity for signals in a relatively wide frequency band.

The plurality of first speakers are equally spaced at intervals of, for example, a spacing D. The distance between the wall surface and the first speaker positioned at an end of the plurality of first speakers on the wall surface side is, for example, D/2.

Thus, it becomes easy to have the peak of the directivity of reproduced sounds corresponding to the first signal appear on the wall surface.

The first signal is, for example, a bass component of a signal eligible for reproduction. The speaker system further comprising: a frequency filter array that divides the signal eligible for reproduction into the first signal and a second signal, which is a treble component of the signal eligible for reproduction, a second filter array that performs second filter processing on the second signal, and an adder array that performs addition processing in which a fourth signal obtained by performing the second filter processing on the second signal is added to a third signal obtained by performing the first filter processing on the first signal. The multi-channel amplifier performs the amplification processing on the third signal that has undergone the addition processing. Each first speaker included in at least part of the plurality of first speakers receives the third signal that have underdone the addition processing and the amplification processing. A peak of the directivity of reproduced sounds, corresponding to the second signal, that have been output from the at least part of the plurality of first speakers, the peak being in the array direction, appears at the central portion of the speaker array due to the second filter processing.

Thus, from the viewpoint of audibility, the user feels as if the reproduced sounds had come from the front. That is, it is suppressed that the user feels uncomfortable with the way of hearing reproduced sounds.

For example, each first speaker included in part of the plurality of first speakers receives the third signal that has undergone the addition processing and the amplification processing; each first speaker included in another part of the plurality of first speakers receives the third signal that has undergone only the amplification processing, without undergoing the addition processing.

Thus, the speaker system can output bass sounds corresponding to the first signal and treble sounds corresponding to the second signal from part of the plurality of first speakers, and can also output the bass sounds corresponding to the first signal from another part of the plurality of first speakers.

For example, the first speakers included in the other part of the plurality of first speakers are positioned at both ends of the speaker array in the array direction.

Thus, the speakers positioned at both ends output only the bass sounds corresponding to the first signal, and do not output the treble sounds corresponding to the second signal. Therefore, it is possible to prevent other users from easily hearing the treble components of the reproduced sounds.

For example, each of the plurality of first speakers receives the third signal that has undergone the addition processing and the amplification processing.

Thus, the speaker system can output the bass sound corresponding to the first signal and the treble sound corresponding to the second signal from each of the plurality of first speakers.

For example, the speaker array further includes a plurality of second speakers that are linearly placed; each of the plurality of second speakers receives the fourth signal that has undergone the amplification processing performed by the multi-channel amplifier; the at least part of the plurality of first speakers and the plurality of second speakers are alternately placed; and a peak of the directivity of reproduced sounds, corresponding to the second signal, that have been output from the at least part of the plurality of first speakers and the plurality of second speakers, the peak being in the array direction, appears at the central portion of the speaker array due to the second filter processing.

Thus, the speaker system can raise the upper frequency limit of a frequency band within which directivity can be controlled. That is, a speaker system is implemented that can control directivity for signals in a relatively wide frequency band.

For example, the plurality of first speakers are equally spaced at intervals of a spacing D, and the plurality of second speakers are also equally spaced at intervals of the spacing D.

Thus, if speakers are spaced at intervals of a spacing D/2 for the second signal (treble component), the speaker system can raise the upper frequency limit of a frequency band within which directivity can be controlled to a value higher than when the speakers are spaced at intervals of the spacing D. That is, a speaker system is implemented that can control directivity for signals in a relatively wide frequency band.

For example, the speaker array is attached to the ceiling of an automobile.

Thus, a distance from a user sitting on a particular seat to the speaker array is very shorter than a distance from another user sitting another seat other than the particular seat to the speaker array. Therefore, a difference between sound pressures, which is caused by attenuation by distance, can be increased, so it is possible to prevent the other user sitting on the other seat from easily hearing the reproduced sounds output from the speaker array.

For example, the speaker array is placed on the dashboard of an automobile.

Thus, since the speaker array can be placed right in front of the user sitting on the driver seat or passenger seat, the user can hear the reproduced sounds from the front and can thereby obtain natural audibility.

It should be noted that these comprehensive or specific aspects may be implemented as an apparatus, a method, an integrated circuit, a computer program, a recording medium such as a computer-readable compact disc-read-only memory (CD-ROM), or any selective combination of a system, a method, an integrated circuit, a computer program, and a recording medium.

For example, a signal processing method according an embodiment of the present disclosure is a signal processing method executed by a speaker system that comprises a speaker array including a plurality of first speakers that are linearly placed and each of which receives a first signal that has been undergone first filter processing and amplification processing, a first filter array that performs the first filter processing, and a multi-channel amplifier that performs the amplification processing. The speaker array is placed in reproduction space that has a wall surface crossing an array direction in which the plurality of first speakers are arranged. In the signal processing method, a peak of the directivity of reproduced sounds, corresponding to the first signal, that have been output from the speaker array, the peak being in the array direction, is shifted toward the wall surface due to the first filter processing.

Thus, in the signal processing method, it is possible to lower the lower frequency limit of a frequency band within which directivity can be controlled. That is, a signal processing method is implemented by which directivity can be controlled for signals in a relatively wide frequency band.

Embodiments will be described with reference to the drawings. All embodiments described below illustrate general or specific examples. Numerals, shapes, materials, constituent elements, the placement positions and connection forms of these constituent elements, steps, the sequence of these steps, and the like are only examples, and are not intended to restrict the present disclosure. Of the constituent elements described in the embodiments below, constituent elements not described in independent claims, each of which indicates the topmost concept, will be described as optional constituent elements.

Each drawing is a schematic drawing and is not necessarily drawn in a rigorous manner. In all drawings, the essentially same constituent elements are denoted by the same numerals and repeated descriptions will sometimes be omitted or simplified.

First Embodiment

Structure of a Speaker System

Figure 2:
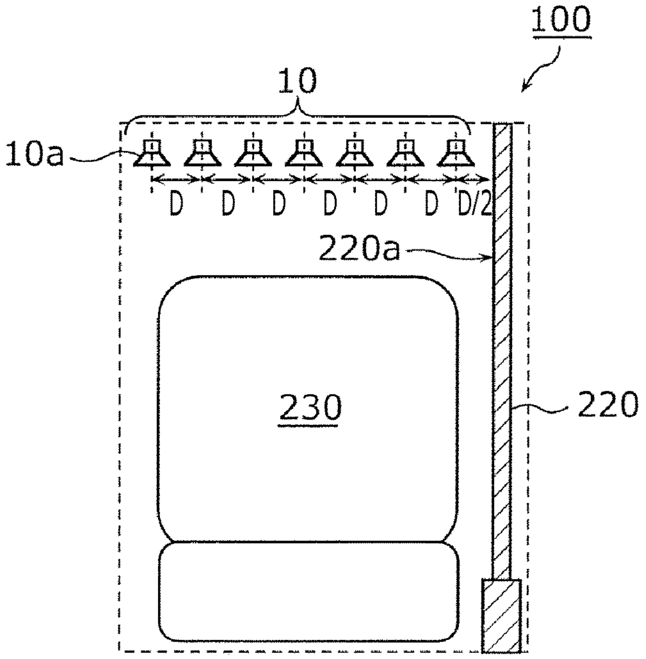
FIG. 2 is an enlarged view of an area II in FIG. 1.
Figure 3:
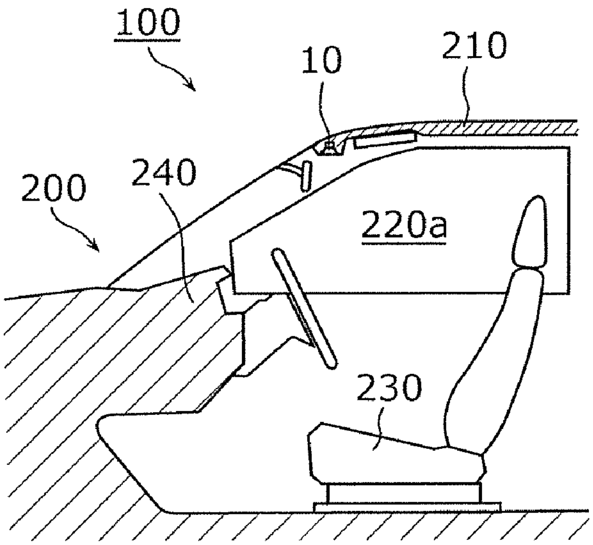
FIG. 3 is a side view of the interior of the automobile in which the speaker system according the first embodiment is placed.

A speaker system according to a first embodiment will be described below with reference to the drawings. In the first embodiment, an example will be described in which the speaker system is placed in the interior of an automobile. FIG. 1 is a plan view illustrating the interior of an automobile in which the speaker system is placed. FIG. 2 is an enlarged view of an area II in FIG. 1. FIG. 3 is a side view of the interior of the automobile in which the speaker system is placed.

The speaker system 100 illustrated in FIGS. 1 to 3 is used in spot reproduction by which reproduced sounds are audible only to a user present in a particular area. In the first embodiment, the speaker system 100, which is placed in the interior of an automobile 200, gives directivity to reproduced sounds so that they are audible only to a user sitting on a driver seat 230. The speaker system 100 has a speaker array 10 composed of a plurality of first speakers 10*a* that are linearly placed. There is no particular limitation on the number first speakers 10*a*.

As illustrated in FIG. 2, the plurality of first speakers 10*a* are equally spaced at intervals of, for example, a spacing D. The distance between a wall surface 220*a* and the first speaker 10*a* positioned at an end of the plurality of first speakers 10*a*, the end being on the same side as the wall surface 220*a*, is D/2. The spacing between adjacent first speakers 10*a* is the distance between their sound output axes (central axes). The distance between the wall surface 220*a* and the first speaker 10*a* at the end is the distance between the wall surface 220*a* and the sound output axis of the first speaker 10*a*.

The speaker array 10 is placed in the inner space of the automobile 200. The inner space of the automobile 200 is closed space enclosed by a ceiling 210 and side walls 220 including window panes and the like. The side walls 220 includes the wall surface 220*a* opposing the user sitting on the driver seat 230.

Specifically, the speaker array 10 is attached to the ceiling 210 in the interior of the automobile 200. More specifically, the speaker array 10 is attached in front of the user sitting on the driver seat 230 of the automobile 200 so as to oppose the user. The speaker array 10 outputs reproduced sounds toward the user. The speaker array 10 is oriented so that its longitudinal direction, that is, the array direction in which the plurality of first speakers 10*a* are arranged, matches the right and left direction of the user.

When the speaker array 10 is attached to the ceiling 210 as described above, the distance from the user sitting on the driver seat 230 to the speaker array 10 is very shorter than the distance between another user sitting on the passenger seat or a rear seat to the speaker array 10. Therefore, a difference between sound pressures, which is caused by attenuation by distance, can be increased, so it is possible to prevent the other user sitting on a seat other than the driver seat 230 from easily hearing the reproduced sounds output from the speaker array 10.

Figure 4:
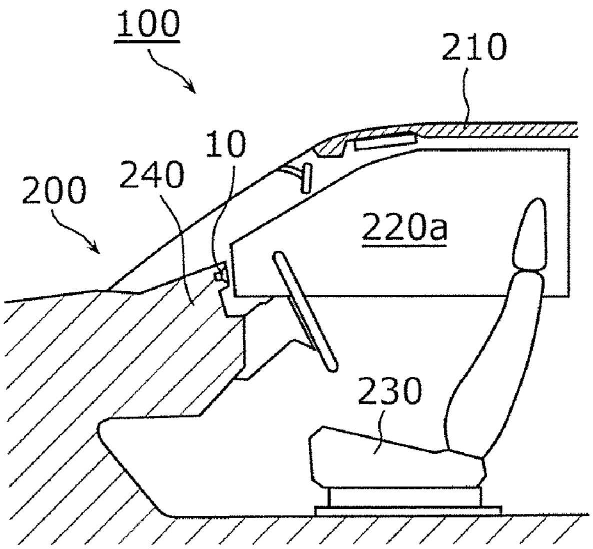
FIG. 4 is a side view of the interior of the automobile in which a speaker array according the first embodiment is placed on a dashboard.

As illustrated in FIG. 4, the speaker array 10 may be placed on a dashboard 240 provided in the automobile 200. FIG. 4 is a side view of the interior of the automobile 200 in which the speaker array 10 is placed on the dashboard 240. In this case as well, the speaker array 10 is placed in front of the user sitting on the driver seat 230 of the automobile 200 so as to oppose the user, and outputs reproduced sounds toward the user. The speaker array 10 is oriented so that its longitudinal direction matches the right and left direction of the user.

When the speaker array 10 is placed on the dashboard 240, the speaker array 10 is positioned right in front of the user sitting on the driver seat 230. Therefore, the user can hear reproduced sounds from the front and can thereby obtain natural audibility.

Functional Structure of the Speaker System

Figure 5:
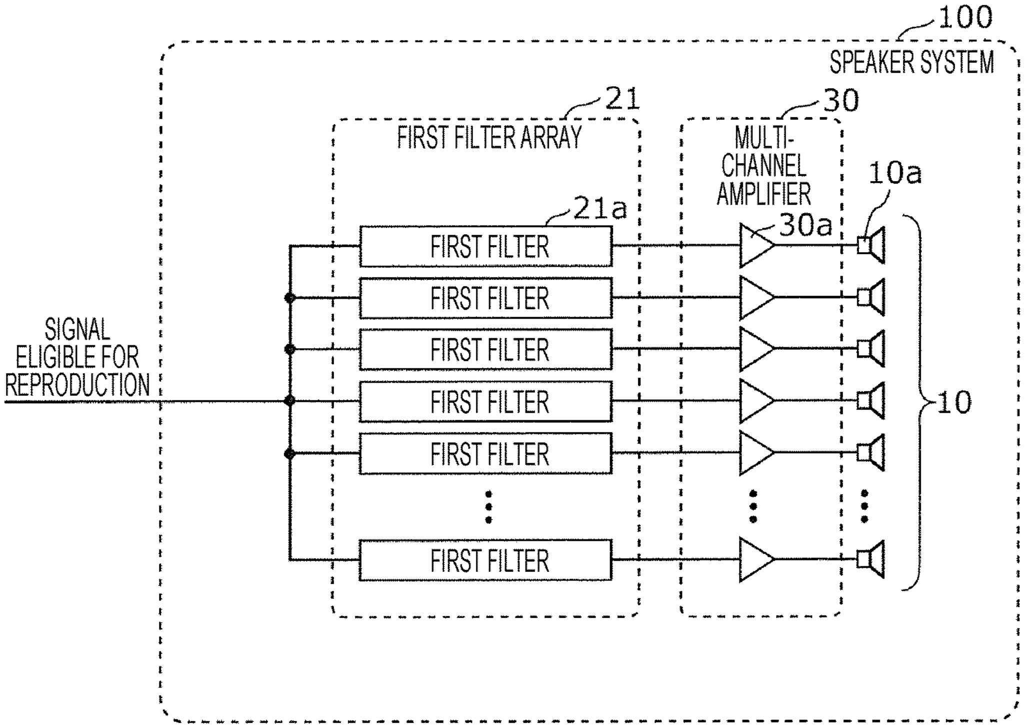
FIG. 5 is a block diagram illustrating the functional structure of the speaker system according to the first embodiment.

Next, the functional structure of the speaker system 100 will be described. FIG. 5 is a block diagram illustrating the functional structure of the speaker system 100.

As illustrated in FIG. 5, the speaker system 100 has a first filter array 21 and a multi-channel amplifier 30 besides the speaker array 10.

The first filter array 21 performs first filter processing. Specifically, the first filter array 21 is composed of a plurality of first filters 21*a*. The plurality of first filters 21*a* correspond to the plurality of first speakers 10*a* on a one-to-one basis. The first filter array 21 is, for example, a two-dimensional fitter. Each of the plurality of first filters 21*a* is implemented by, for example, a one-dimensional digital filter (filter circuit that performs digital processing).

Figure 6:
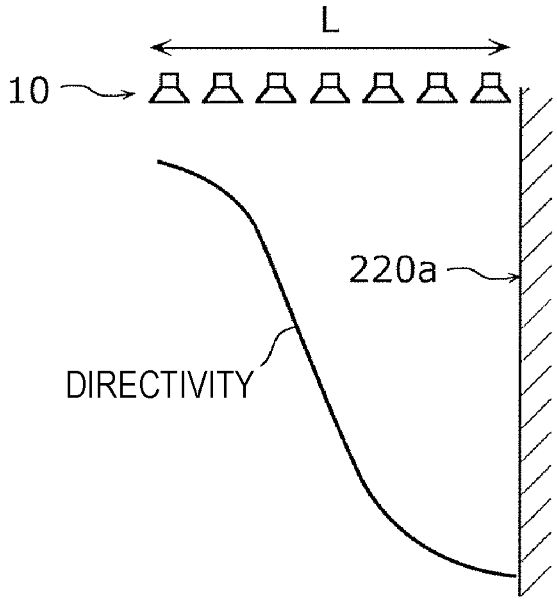
FIG. 6 illustrates the directivity of reproduced sounds output from the speaker array according to the first embodiment.

Each of the plurality of first filters 21*a* acquires a signal eligible for reproduction and performs first filter processing on the acquired signal eligible for reproduction. In the first embodiment, a signal eligible for reproduction is an example of the first signal. Specific processing in first filter processing differs, for example, for each first filter 21*a*. Each of the plurality of first speaker 10*a* outputs a sound according to the signal eligible for reproduction that has undergone first filter processing as described above. Then, directivity as illustrated in FIG. 6 is given to the reproduced sounds output from the speaker array 10. FIG. 6 illustrates the directivity of reproduced sounds output from the speaker array 10. In other words, when the whole of the plurality of first speakers 10*a* is assumed to be a single speaker, reproduced sounds output from the speaker array 10 are reproduced sounds output from the speaker.

As illustrated in FIG. 6, the directivity of the reproduced sounds output from the speaker array 10 is lower at a position more distant from the wall surface 220*a*. A peak of the directivity of reproduced sounds in the array direction in which the plurality of first speaker 10*a* are arranged is shifted toward the wall surface 220*a* with respect to the central portion due to the first filter processing described above. A portion in which the directivity is low is formed by, for example, canceling sounds output from the plurality of first speakers 10*a* by the first filter processing. Effects obtained from this directivity of reproduced sounds will be described later.

The multi-channel amplifier 30 performs amplification processing. Specifically, the multi-channel amplifier 30 is composed of a plurality of amplifiers 30*a*. The plurality of amplifiers 30*a* correspond to the plurality of first speaker 10*a* and the plurality of first filters 21*a* on a one-to-one basis. Each of the plurality of amplifiers 30*a* amplifies an output signal received from the corresponding first filter 21*a* and outputs the amplified output signal to the corresponding first speaker 10*a*. Each of the plurality of amplifiers 30*a* is implemented by, for example, an operation amplifier.

As described above, each of the plurality of first speakers 10*a* receives a signal eligible for reproduction that has undergone first filter processing and amplification processing. The speaker array 10 is formed by linearly placing a plurality of first speakers 10*a* of this type. Reproduced sounds corresponding to signals eligible for reproduction are output from the speaker array 10.

Effects Obtained by the Directivity of the Speaker Array

Next, effects obtained by directivity, as illustrated in FIG. 6, that is implemented by first filter processing (also referred to as the directivity of the speaker array 10) will be described with reference to a comparative example. FIG. 7 illustrates the directivity of a speaker array in the comparative example.

A peak of the directivity of the speaker array 90 in the comparative example appears at the central portion in the array direction in which the plurality of speakers constituting the speaker array 90 are placed. The directivity of the speaker array 90 in the comparative example is lower at a position closer to an end of the plurality of speakers constituting the speaker array 90 in the array direction. Thus, sounds from the speaker array 90 are loudly audible only to the user sitting on a particular seat (for example, the driver seat) in the interior of the automobile. A specific method of providing this type of directivity is disclosed in, for example, Matsumoto Kouji and Nishikawa Kiyoshi, "A Design of Directional Array Speakers with Specified Sidelobe Size", The Institute of Electronics, Information, and Communication Engineers (IEICE), IEICE technical report, 2004-74, p 13-p 18). In the method in this disclosure, spatial windows are designed by time frequency as spatial domains (or spatial frequency domains) in a frequency domain; the higher the time frequency is, the narrower the window width of the spatial window is (a passband is widened in the spatial frequency domains).

However, the directivity of the speaker array 90 in the comparative example is based on the premise that sounds are not reflected in space in which the speaker array 90 is placed. If the speaker array 90 in the comparative example is placed in space including the wall surface 220*a*, therefore, a problem arises in that the sound field is disturbed by reflected sounds that are generated on the wall surface 220*a* and desired directivity cannot thereby be obtained.

Figure 8:
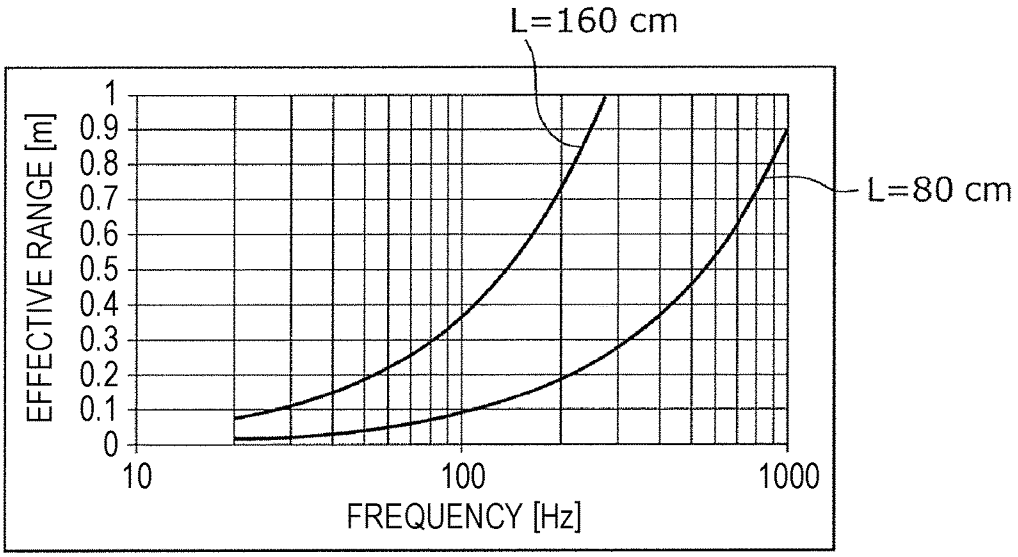
FIG. 8 illustrates a relationship between the length L of the speaker array in the comparative example and an effective range.

Another problem is that if there is a limitation on the length of the speaker array 90, the lower frequency limit of a frequency band within which directivity can be controlled (the frequency band will also be referred to as the control band). This is because the lower frequency limit of the control band is inversely proportional to the length L of the speaker array 90 in the longitudinal direction. FIG. 8 illustrates a relationship between the length L of the speaker array 90 and an effective range.

In FIG. 8, the effective range is a parameter indicating that the longer the effective range is, the easier it is to control directivity. At the same frequency, the longer the length L of the speaker array 90 is, the easier it is to control directivity, as illustrated in FIG. 8. Therefore, the lower frequency limit of the control band can be lowered. Since, in narrow space such as space in an automobile, there is a limitation on the length of the speaker array 90, the lower frequency limit of the control band is limited.

Figure 7:
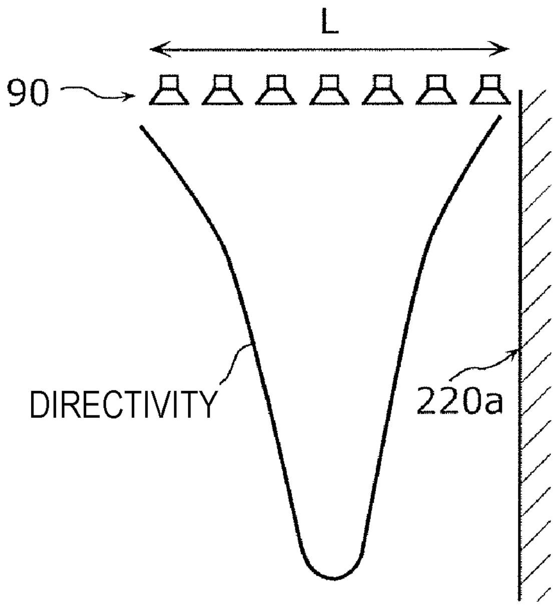
FIG. 7 illustrates the directivity of a speaker array in a comparative example.
Figure 9:
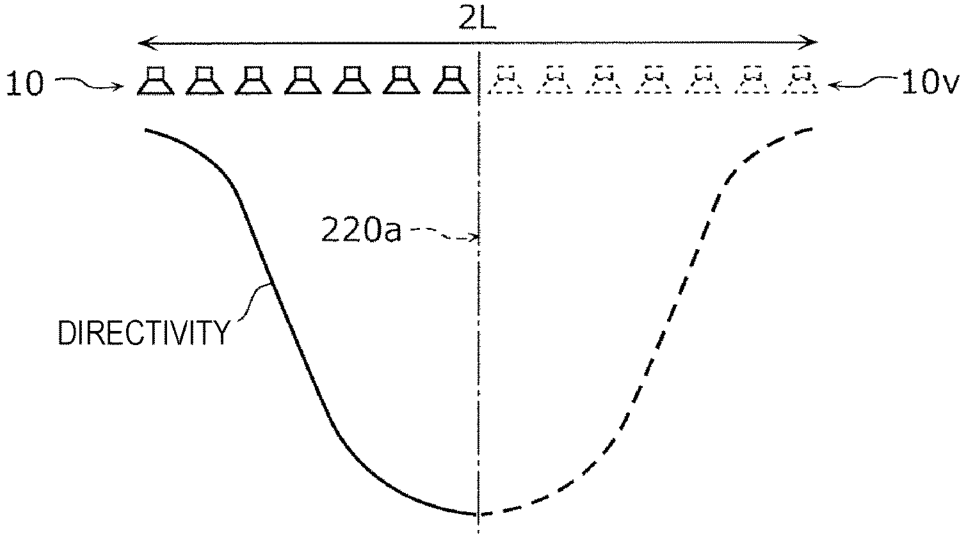
FIG. 9 illustrates the directivity of the speaker array according to the first embodiment.

First filter processing executed to implement the directivity of the speaker array 10 is designed so that as illustrated in FIG. 9, directivity having a peak at a central portion (on the wall surface 220*a*) as illustrated in FIG. 7 is given to a speaker array, with a total length of 2L, which includes a virtual speaker array 10*v* with the length L, the speaker array being symmetric with respect to the wall surface 220*a*. FIG. 9 illustrates the directivity of the speaker array 10.

Specifically, reproduced sounds output from the speaker array 10 are reflected the on the wall surface 220*a*. In the implementation of the directivity of the speaker array 10, therefore, the reflected sounds generated as a result of the reflection of the regenerated sounds on the wall surface 220*a* are used as sounds output from the virtual speaker array 10*v*. In FIG. 9, the directivity of the speaker array 10 is indicated by a solid line and a peak of the directivity in the array direction appears on the wall surface 220*a* due to first filter processing.

Thus, although the length of the speaker array 10 is L, the lower frequency limit of the control band of the speaker array 10 is the same as the lower frequency limit of the control band of the speaker array with a length of 2L. Since the lower frequency limit of the control band is inversely proportional to the length of a speaker array as described above, the lower frequency limit of the control band of the speaker array 10 is half the lower frequency limit of the control band of the speaker array 90 in the comparative example. Therefore, even if the speaker array 10 is placed in narrow space, the speaker array 10 can give desired directivity to sounds in a relatively wide frequency band.

To implement the directivity of the speaker array 10, reflection of reproduced sounds on the side wall 220*a* is used. Therefore, the sound field is less likely to be disturbed by the reflection of reproduced sounds on the wall surface 220*a*, which is advantageous in that desired directivity can be easily implemented.

In the speaker system 100, it is only necessary to perform first filter processing on the assumption that the speaker array including the virtual speaker array 10*v* has a length longer than the speaker array 10. That is, the virtual speaker array 10*v* may not have the same length as the speaker array 10; the length of the virtual speaker array 10*v* may be shorter than the length of the speaker array 10. That is, the directivity of the speaker array 10 only needs to have a peak, in the array direction, that is shifted toward the wall surface 220*a* due to first filter processing.

Variation

Although the length L of the speaker array 10 is, for example, 600 mm, the length L may be appropriately changed according to the size of space in which the speaker array 10 is placed. In addition, there is a limitation neither on the number of the plurality of first speaker 10*a* constituting the speaker array 10 (the number of channels) nor on the width of the spacing D. The narrower the spacing D is, the more the upper frequency limit in the control band can be raised.

Although, in FIG. 1, the speaker system 100 is applied only to the driver seat 230, a similar speaker system 100 may be applied to the passenger seat or a rear seat instead of the driver seat 230. In addition to the speaker system 100 applied to the driver seat 230, a similar speaker system 100 may be applied to the passenger seat or a rear seat. If a speaker system is applied to a rear seat, the speaker array 10 may be attached to the ceiling above the rear seat or the backrest of the driver seat 230 or passenger seat.

Second Embodiment

From the viewpoint of audibility, a human is more sensitive to a direction from which treble sounds having relatively sharp directivity come than to a direction from which bass sounds come. Since, in the speaker system 100 according to the first embodiment, the peak of directivity is shifted toward the wall surface 220*a* in all frequency bands of reproduced sounds, therefore, treble sounds may be heard from the same side as the wall surface 220*a*. That is, the user may feel uncomfortable with the way of hearing treble sounds.

Figure 10:
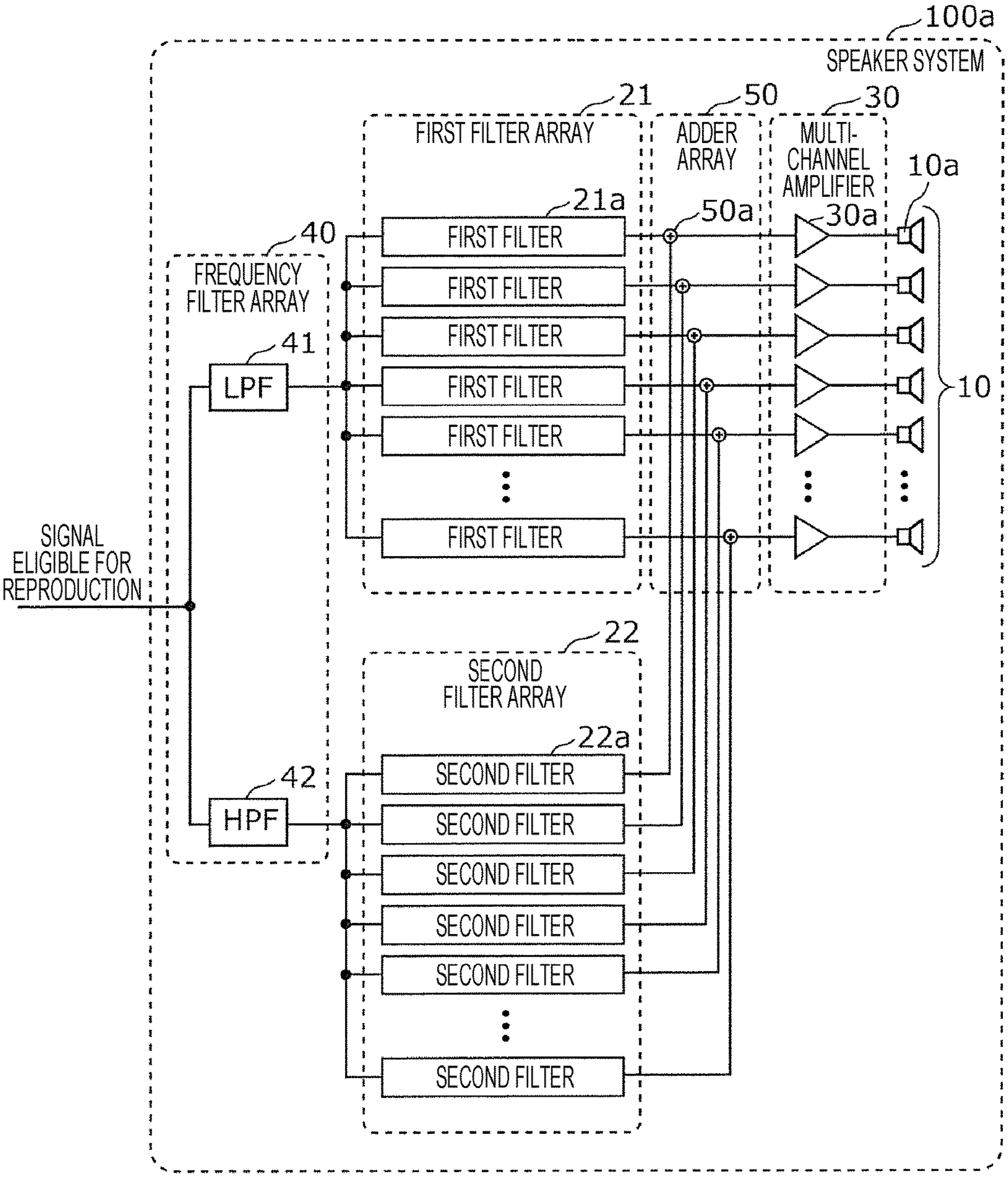
FIG. 10 is a block diagram illustrating the functional structure of a speaker system according to a second embodiment.

In view of this, in the speaker system 100, directivity as illustrated in FIG. 6 may be given to the bass components of reproduced sounds and directivity as illustrated in FIG. 7 may be given to the treble components of the reproduced sounds. FIG. 10 is a block diagram illustrating the functional structure of a speaker system of this type according to a second embodiment.

In the second embodiment below, differences from the first embodiment will be mainly described and repeated descriptions will be appropriately omitted. The second embodiment will be described on the assumption that the first signal is the bass component of a signal eligible for reproduction and the second signal is the treble component of the signal eligible for reproduction.

As illustrated in FIG. 10, the speaker system 100*a* according to the second embodiment includes the speaker array 10, first filter array 21, and multi-channel amplifier 30 as with the speaker system 100. However, the speaker system 100*a* further includes a frequency filter array 40, an adder array 50, and a second filter array 22.

The frequency filter array 40 divides a signal eligible for reproduction into the first signal, which is the bass component of the signal eligible for reproduction, and the second signal, which is the treble component of the signal eligible for reproduction. Specifically, the frequency filter array 40 has a low-pass filter (LPF) 41, which extracts the first signal from a signal eligible for reproduction and outputs the first signal to the first filter array 21, and also has a high-pass filter (HPF) 42, which extracts the second signal from the signal eligible for reproduction and outputs the second signal to the second filter array 22.

Figure 11:
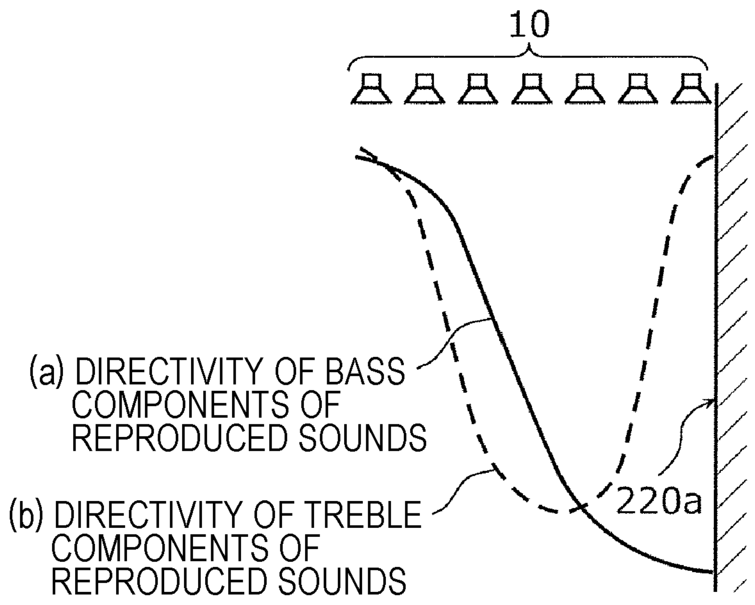
FIG. 11 illustrates the directivity of reproduced sounds output from the speaker array in the second embodiment.

Each of the plurality of first filters 21*a* constituting the first filter array 21 acquires the first signal from the LPF 41 and performs first filter processing on the acquired first signal. Specific processing in first filter processing differs, for example, for each first filter 21*a*. When each of the plurality of first speakers 10*a* outputs a sound according to the signal eligible for reproduction that has undergone first filter processing as described above, directivity as indicated by (a) in FIG. 11 is given to reproduced sounds (specifically, the bass components of reproduced sounds), corresponding to the first signal, that are output from the speaker array 10. FIG. 11 illustrates the directivity of reproduced sounds output from the speaker array 10 in the second embodiment.

The second filter array 22 performs second filter processing different from first filter processing. Specifically, the second filter array 22 is composed of a plurality of second filters 22*a*. The plurality of second filters 22*a* correspond to the plurality of first speakers 10*a* on a one-to-one basis. The second filter array 22 is, for example, a two-dimensional fitter. Each of the plurality of second filters 22*a* is implemented by, for example, a one-dimensional digital filter (filter circuit that performs digital processing).

Each of the plurality of second filters 22*a* acquires the second signal from the HPF 42 and performs second filter processing on the acquired second signal. Specific processing in second filter processing differs for, for example, each second filter 22*a*. Each of the plurality of first speaker 10*a* outputs a sound according to the signal eligible for reproduction that has undergone second filter processing as described above. Then, directivity as indicated by (b) in FIG. 11 is given to reproduced sounds, corresponding to the second signal, that are output from the speaker array 10.

The adder array 50 performs addition processing in which a fourth signal obtained by performing second filter processing on the second signal is added to a third signal obtained by performing first filter processing on the first signal. Specifically, the adder array 50 is composed of a plurality of adders 50*a*. The plurality of adders 50*a* correspond to the plurality of first speakers 10*a* on a one-to-one basis. Each of the plurality of adders 50*a* adds the fourth signal output from one second filter 22*a* to the third signal output from one first filter 21*a*. Specifically, the adder 50*a* is implemented by a digital arithmetic circuit or the like.

After addition processing has been performed on the third signal by the adder array 50, the multi-channel amplifier 30 performs amplification processing on the third signal. The third signal after amplification processing is entered into the speaker array 10.

Each of the plurality of first speaker 10*a* receives the third signal that has undergone addition processing by the adder array 50 and amplification processing by the multi-channel amplifier 30. That is, the plurality of first speakers 10*a* are used in both output of treble-component sounds and output of bass-component sounds. As a result, a peak of the directivity of the reproduced sounds, corresponding to the first signal, that have been output from the speaker array 10, the peak being in the array direction of the plurality of first speakers 10*a*, is shifted toward the wall surface 220*a* due to first filter processing, as indicated by (a) in FIG. 11.

By contrast, a peak of the directivity of the reproduced sounds (specifically, the treble components of the reproduced sounds), corresponding to the second signal, that are output from the speaker array 10, the peak being in the array direction of the plurality of first speakers 10*a*, appears at the central portion of the speaker array 10 due to second filter processing, as indicated by (b) in FIG. 11.

As described above, in the speaker system 100*a*, each signal eligible for reproduction is divided into the first signal, which is the bass component of the signal, and the second signal, which is the treble component of the signal, by the frequency filter array 40 (composed of the LPF 41 and HPF 42). As described in the first embodiment, the first signal (bass component) requires that the speaker array length be long to widen the control band. Therefore, first filter processing described in the first embodiment is performed on the first signal. This lowers the lower frequency limit of the control band.

However, the second signal does not require that the speaker array length be long, unlike the first signal. Therefore, second filter processing different from first filter processing is performed on the second signal so that a peak of the directivity appears at the central portion of the plurality of first speakers 10*a* in their array direction.

As described above, from the viewpoint of audibility, a human is more sensitive to a direction from which treble sounds having relatively sharp directivity come than to a direction from which bass sounds come. Since, in the speaker system 100*a*, a peak of the directivity of reproduced sounds corresponding to the second sound, each of which is a treble component, appears at the central portion, the user feels as if the reproduced sounds had come from the front. That is, it is suppressed that the user feels uncomfortable with the way of hearing reproduced sounds. In the speaker system 100*a*, the first signal, which is a bass component, undergoes processing as in the first embodiment, so it is also possible to lower the lower frequency limit in the control band.

Variation

Figure 12:
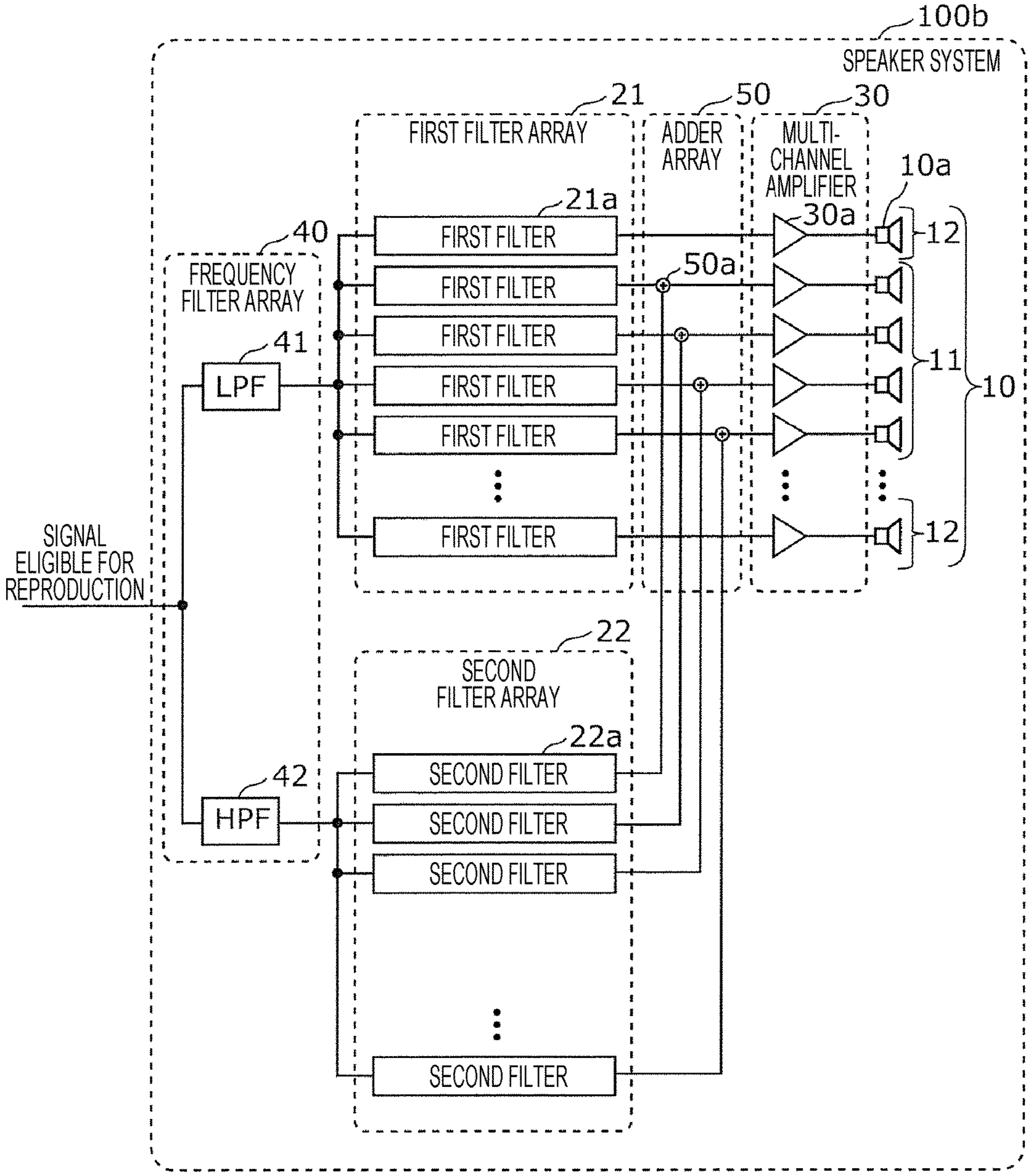
FIG. 12 is a block diagram illustrating the functional structure of a speaker system in a variation of the second embodiment.

As described above, the second signal (treble component) does not require that the speaker array length be long. Therefore, the first speakers 10*a* positioned at both ends of the speaker array 10 may output only the bass sound corresponding to the first signal. FIG. 12 is a block diagram illustrating the functional structure of a speaker system in a variation of the second embodiment.

In the speaker system 100*b*, illustrated in FIG. 12, in the variation of the second embodiment, each first speaker 10*a* included in a part 11 of the plurality of first speakers 10*a* receives the third signal that has undergone addition processing by the adder array 50 and amplification processing by the multi-channel amplifier 30. That is, each first speaker 10*a* in the part 11 of the plurality of first speakers 10*a* outputs both the treble-component sound and the bass-component sound. The part 11 of the plurality of first speakers 10*a* is positioned at the central portion of the plurality of first speakers 10*a* in their array direction. There is no particular limitation on the number of first speakers 10*a* included in the part 11 of the plurality of first speakers 10*a*.

By contrast, each first speaker 10*a* included in another part 12 of the plurality of first speakers 10*a* receives the third signal that has undergone only amplification processing without undergoing addition processing. That is, of the treble-component sound and bass-component sound, each first speaker 10*a* in the other part 12 of the plurality of first speakers 10*a* outputs only the bass-component sound. The first speakers 10*a* included in the other part 12 of the plurality of first speakers 10*a* are positioned at both ends of the plurality of first speakers 10*a* in their array direction. There is no particular limitation on the number of first speakers 10*a* included in the other part 12 of the plurality of first speakers 10*a*. To maintain symmetry, however, a match is preferably made between the number of first speakers 10*a* positioned at one end and the number of first speakers 10*a* positioned at the other end.

As described above, in the speaker system 100*b*, the first speakers 10*a* positioned at both ends of the plurality of first speakers 10*a* output only a bass sound corresponding to the first signal, but do not output a treble sound corresponding to the second signal. Thus, it is possible to prevent the user sitting on a seat other than the driver seat 230 from easily hearing reproduced sounds output from the speaker array 10.

In the speaker system 100*a*, it suffices to enter the third signal that has undergone addition processing and amplification processing into each first speaker 10*a* included in at least part of the plurality of first speakers 10*a* in the speaker array 10, as in the speaker system 100*b* described above. Thus, a peak of the directivity of the reproduced sounds, corresponding to the second signal, that have been output from the at least part of the plurality of first speakers 10*a*, the peak being in the array direction of the plurality of first speakers 10*a*, appears at the central portion of the speaker array 10 due to the second filter processing.

Third Embodiment

Figure 13:
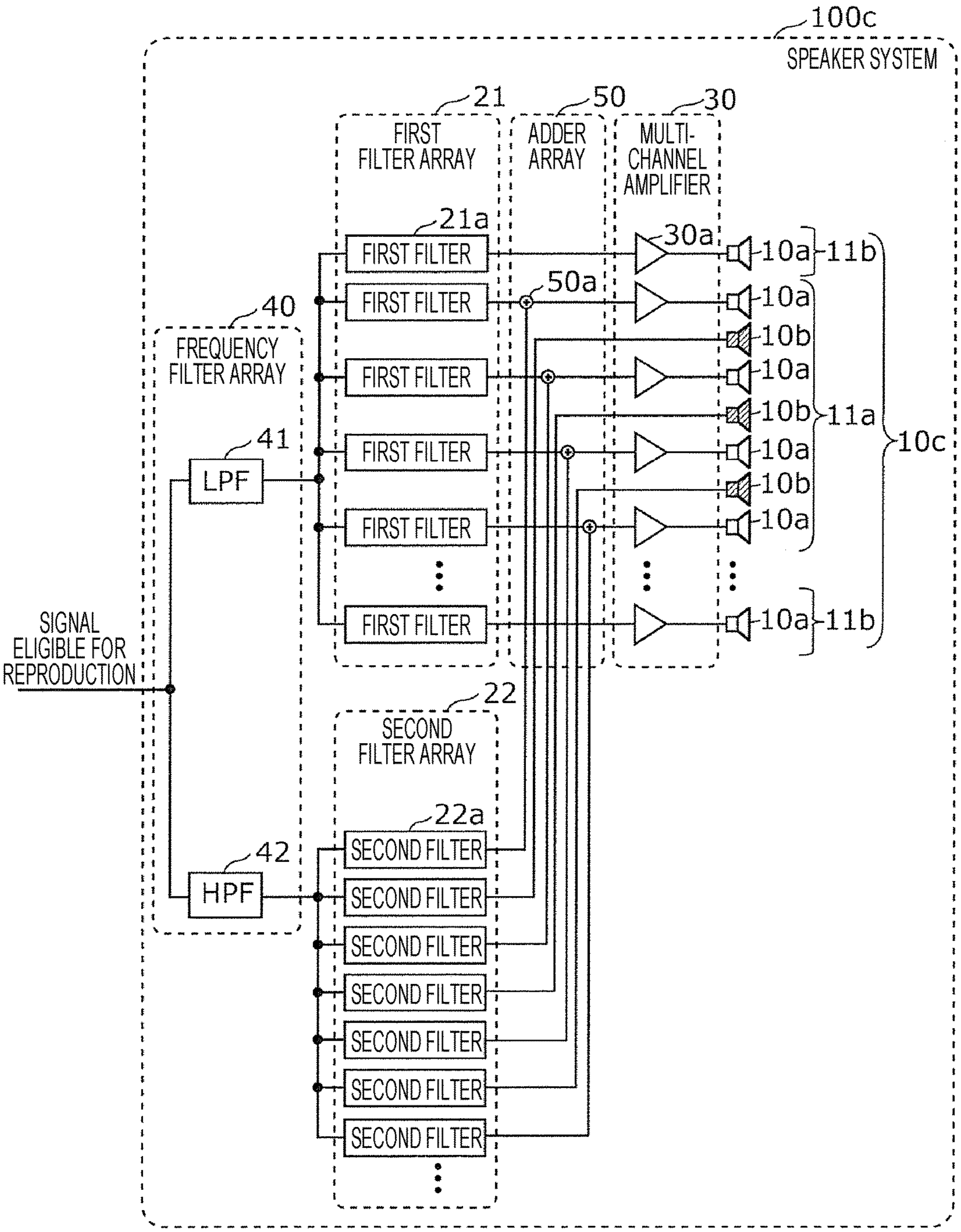
FIG. 13 is a block diagram illustrating the functional structure of a speaker system according to a third embodiment.

As described above, as the spacing D between each two of the plurality of first speakers 10*a* constituting the speaker array 10 becomes narrow, the upper frequency limit in the control band can be more raised. In view of this, the speaker array 10 in the speaker system 100*b* may further include a plurality of second speakers that output a treble sound corresponding to the second signal. A practical spacing between speakers for the second signal may be narrowed by alternating placing a plurality of first speakers 10*a* and a plurality of second speakers. FIG. 13 is a block diagram illustrating the functional structure of this type of speaker system according to a third embodiment.

In the third embodiment below, differences from the speaker system 100*b* in the variation of the second embodiment will be mainly described and repeated descriptions will be appropriately omitted.

As illustrated in FIG. 13, a speaker array 10*c* in a speaker system 100*c* according to the third embodiment includes a plurality of second speaker 10*b* that are linearly placed, unlike the speaker array 10. There is no particular limitation on the number of the plurality of second speakers 10*b*.

Part of the plurality of first speaker 10*a* and the plurality of second speaker 10*b* are alternately placed. It is only necessary to alternately place part of the plurality of first speaker 10*a* and the plurality of second speaker 10*b*. Therefore, all of the plurality of first speakers 10*a* and the plurality of second speaker 10*b* may be alternately placed, for example.

The speaker array 10*c* includes a first speaker group 11*a* positioned at the central portion of the plurality of first speakers 10*a* in their array direction, and also includes a second speaker group 11*b* positioned at both ends of the plurality of first speakers 10*a* in their array direction. The first speaker group 11*a* includes a plurality of first speaker 10*a* and a plurality of second speakers 10*b*. The second speaker group 11*b* includes a plurality of first speakers 10*a*.

Each first speaker 10*a* in the first speaker group 11*a* receives the third signal that has undergone addition processing by the adder array 50 and amplification processing by the multi-channel amplifier 30. That is, each first speaker 10*a* in the first speaker group 11*a* output both the treble-component sound and the bass-component sound.

By contrast, each second speaker 10*b* in the first speaker group 11*a* receives the fourth signal that has undergone amplification processing by the multi-channel amplifier 30. That is, of the treble-component sound and bass-component sound, each second speaker 10*b* in the first speaker group 11*a* outputs only the treble-component sound.

Each first speaker 10*a* in the second speaker group 11*b* receives the third signal that has not undergone addition processing by the adder array 50 but has undergone amplification processing by the multi-channel amplifier 30. That is, of the treble-component sound and bass-component sound, each first speaker 10*a* in the first speaker group 11*a* outputs only the bass-component sound.

The plurality of second speakers 10*b* are equally spaced at intervals of the spacing D as with the plurality of first speakers 10*a*. This means that the plurality of speakers in the first speaker group 11*a* (a plurality of first speakers 10*a* and a plurality of second speakers 10*b*) are spaced at intervals of the spacing D/2 for the second signal (treble component). This raises the upper frequency limit in the control band.

Figure 14:
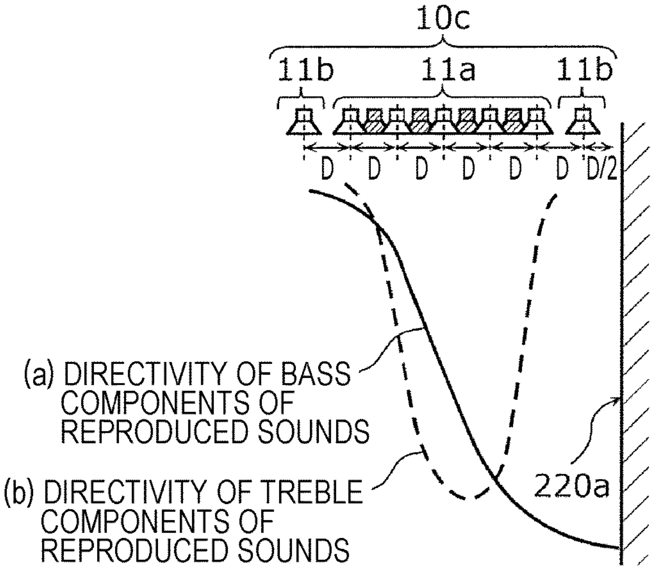
FIG. 14 illustrates the directivity of reproduced sounds output from the speaker array according to the third embodiment.

A peak of the directivity of the reproduced sounds, corresponding to the second signal, that have been output from the second speaker group 11*b*, the peak being in the array direction of the plurality of first speakers 10*a*, appears at the central portion of the speaker array 10*c* due to the second filter processing, as indicated by (b) in FIG. 14. FIG. 14 illustrates the directivity of reproduced sounds output from the speaker array 10*c* in the third embodiment.

By contrast, the plurality of first speakers 10*a* in the speaker array 10*c* are spaced at intervals of the spacing D for the first signal (bass component). Therefore, as in the first and second embodiments, a peak of the directivity of the reproduced sounds, corresponding to the first signal, that have been output from the speaker array 10*c*, the peak being in the array direction of the plurality of first speakers 10*a*, is shifted toward the wall surface 220*a* due to first filter processing, as indicated by (a) in FIG. 14.

Since, in the speaker system 100*c*, the second speakers 10*b*, each of which outputs a treble sound corresponding to the second sound, are further included as described above, the upper frequency limit in the control band can be raised.

Fourth Embodiment

Figure 15:
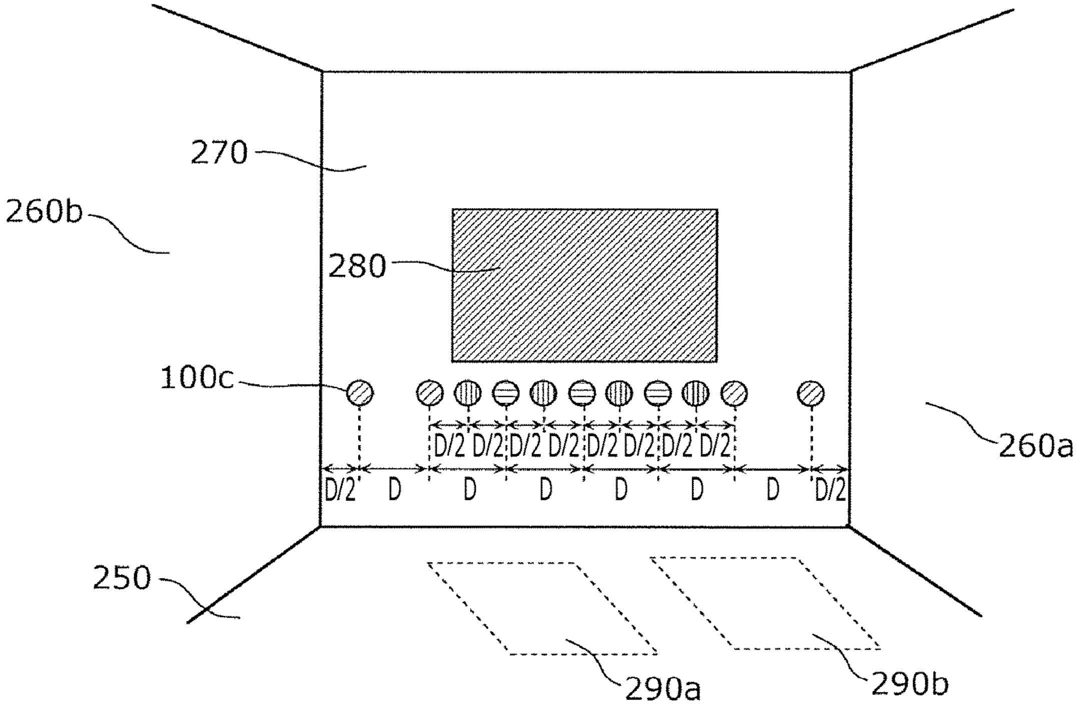
FIG. 15 illustrates an example in which the speaker system according to the third embodiment is applied.

In a fourth embodiment, an example in which the speaker system 100*c* according to the third embodiment is applied will be described with reference to FIG. 15. FIG. 15 illustrates an example in which the speaker system 100*c* is applied.

As illustrated in FIG. 15, the speaker system 100*c* is installed in a living room 250. The speaker system 100*c* is disposed so that the right is in contact with a wall surface 260*a* of the living room 250 and the left end is in contact with a wall surface 260*b* of the living room 250. The wall surface 260*a* and wall surface 260*b* play a role similarly to the side walls 220, in the third embodiment, that include window panes and the like. The operation and the like of the wall surface 260*a* and wall surface 260*b* are the same as in the third embodiment, so their descriptions will be omitted.

In the fourth embodiment, a screen 280 is attached to or projected onto a wall surface 270. It is possible to reproduce the same signal from all speakers when one screen is displayed on the screen 280 and to provide different sounds to an area 290*a* and an area 290*b* when two screens are displayed on the screen 280. Since the area 290*a* is adjacent to the wall surface 260*a* and the area 290*b* is adjacent to the wall surface 260*b*, control is possible until a lower frequency domain is attained as in the third embodiment.

The living room 250 may have only one side wall, depending on the shape of the living room 250. In this case, in only one area, a reproduction band for bass sounds can be controlled until a low frequency is attained. Although, in the fourth embodiment, a living room is taken as an example, another type of room may be used. The screen 280 may be omitted.

Other Embodiments

So far, embodiments have been described. However, the present disclosure is not limited to these embodiments.

For example, although the speaker systems in the above embodiments are applied to space in an automobile or a dwelling, the speaker systems may be applied to other space having wall surfaces. The speaker systems in the above embodiments may be applied to space in a moving body other than an automobile. Alternatively, the speaker systems in the above embodiments may be used in a museum, a commercial facility such as a department store or display space, or may be applied to a signage in public space.

The structures of the speaker systems in the above embodiments are just examples. The speaker systems may further include, for example, a digital-to-analog (D/A) converter, a low-pass filter (LPF), a high-pass filter (HPF), an amplifier, an analog-to-digital (A/D) converter, and other constituent elements. Although signal processing executed in the speaker systems in the above embodiments is mainly digital signal processing, part of the signal processing may be analog signal processing.

The present disclosure also includes embodiments in which various variations that a person having ordinary skill in the art thinks of are applied to the embodiments described above and embodiments in which constituent elements and functions described in the above embodiments are arbitrarily combined without departing from the intended scope of the present disclosure.

For example, the present disclosure may be implemented as a signal processing method executed by a speaker system. Alternatively, the present disclosure may be implemented as a signal processing device (integrated circuit) that outputs processed signals to a speaker array.

The speaker system in the present disclosure is useful as a speaker system that can perform spot reproduction by which reproduced sounds are audible only to a user present in a particular area.

What is claimed is:

1. A speaker system comprising:
- a speaker array including a plurality of first speakers that are linearly placed and each of which receives a first signal that has been processed by first filter processing and amplification processing;
- a first filter array configured to perform the first filter processing; and
- a multi-channel amplifier configured to perform the amplification processing,
- wherein the speaker array is placed in reproduction space that has a wall surface crossing an array direction in which the plurality of first speakers are arranged,
- a peak of a directivity of reproduced sounds, corresponding to the first signal, that have been output from the speaker array, the peak being in the array direction, is shifted toward the wall surface due to the first filter processing,
- the plurality of first speakers are equally spaced at intervals of a spacing D, and
- a distance between the wall surface and the first speaker positioned at an end of the plurality of first speakers on the wall surface side is D/2.

2. The speaker system according to claim 1,
wherein the peak appears on the wall surface.

3. The speaker system according to claim 1,
wherein the first signal is a bass component of a signal eligible for reproduction; and
the speaker system further comprising
- a frequency filter array configured to divide the signal eligible for reproduction into the first signal and a second signal, which is a treble component of the signal eligible for reproduction,
- a second filter array configured to perform second filter processing on the second signal, and
- an adder array configured to perform addition processing in which a fourth signal obtained by performing the second filter processing on the second signal is added to a third signal obtained by performing the first filter processing on the first signal;

the multi-channel amplifier configured to perform the amplification processing on the third signal that has undergone the addition processing;

each first speaker included in at least part of the plurality of first speakers receives the third signal that have processed by the addition processing and the amplification processing; and a peak of a directivity of reproduced sounds, corresponding to the second signal, that have been output from the at least part of the plurality of first speakers, the peak being in the array direction, appears at a central portion of the speaker array due to the second filter processing.

4. The speaker system according to claim 3, wherein each first speaker included in part of the plurality of first speakers receives the third signal that has processed by the addition processing and the amplification processing, and each first speaker included in another part of the plurality of first speakers receives the third signal that has processed by only the amplification processing, without the addition processing.

5. The speaker system according to claim 4, wherein the first speakers included in the another part of the plurality of first speakers are positioned at both ends of the speaker array in the array direction.

6. The speaker system according to claim 3, wherein each of the plurality of first speakers receives the third signal that has processed by the addition processing and the amplification processing.

7. The speaker system according to claim 3, wherein the speaker array further includes a plurality of second speakers that are linearly placed, each of the plurality of second speakers receives the fourth signal that has processed by the amplification processing performed by the multi-channel amplifier, the at least part of the plurality of first speakers and the plurality of second speakers are alternately placed, and a peak of a directivity of reproduced sounds, corresponding to the second signal, that have been output from the at least part of the plurality of first speakers and the plurality of second speakers, the peak being in the array direction, appears at the central portion of the speaker array due to the second filter processing.

8. The speaker system according to claim 7, wherein the plurality of first speakers are equally spaced at intervals of a spacing D, and the plurality of second speakers are equally spaced at intervals of the spacing D.

9. The speaker system according to claim 1, wherein the speaker array is attached to a ceiling of an automobile.

10. The speaker system according to claim 1, wherein the speaker array is placed on a dashboard of an automobile.

11. A signal processing method, executed by a speaker system that includes a speaker array including a plurality of first speakers that are linearly placed and each of which receives a first signal that has been processed by first filter processing and amplification processing, a first filter array configured to perform the first filter processing, and a multi-channel amplifier configured to perform the amplification processing, the method comprising:

placing the speaker array in reproduction space that has a wall surface crossing an array direction in which the plurality of first speakers are arranged; and shifting a peak of a directivity of reproduced sounds, corresponding to the first signal, that have been output from the speaker array, the peak being in the array direction, toward the wall surface due to the first filter processing, wherein the plurality of first speakers are equally spaced at intervals of a spacing D, and a distance between the wall surface and the first speaker positioned at an end of the plurality of first speakers on the wall surface side is D/2.

* * * * *